United States Patent
Hontzeas

(10) Patent No.: US 6,246,876 B1
(45) Date of Patent: Jun. 12, 2001

(54) SYNCHRONIZATION MESSAGES FOR HAND-OFF OPERATIONS

(75) Inventor: Tony Hontzeas, Coahuila (MX)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/133,577

(22) Filed: Aug. 13, 1998

Related U.S. Application Data

(60) Provisional application No. 60/133,577, filed on Nov. 13, 1997.

(51) Int. Cl.[7] .................................................. H04Q 7/20
(52) U.S. Cl. .................. 455/436; 455/437; 455/439; 455/442; 455/438
(58) Field of Search .................... 455/436, 437, 455/438, 439, 442; 370/331

(56) References Cited

U.S. PATENT DOCUMENTS

| | | | |
|---|---|---|---|
| 5,509,035 | * 4/1996 | Teidemann, Jr. et al. | 375/356 |
| 5,640,414 | * 6/1997 | Blakeney, II et al. | 375/200 |
| 5,768,264 | * 6/1998 | Anderson et al. | 370/280 |
| 5,850,607 | * 12/1998 | Muszynski | 455/442 |
| 5,963,852 | * 10/1999 | Schlang et al. | 455/76 |
| 5,987,317 | * 11/1999 | Venturini | 455/412 |
| 6,038,449 | * 3/2000 | Corriveau et al. | 455/439 |

FOREIGN PATENT DOCUMENTS

| | | | |
|---|---|---|---|
| 0 577 960 A1 | 1/1994 | (EP) | H04Q/7/04 |
| 0 920 864 | 6/1999 | (EP) . | |
| PCT/FI94/00038 | 8/1995 | (WO) | H04Q/7/38 |

* cited by examiner

Primary Examiner—William G. Trost
Assistant Examiner—Marceau Milord
(74) Attorney, Agent, or Firm—Jenkens & Gilchrist, P.C.

(57) ABSTRACT

A method and apparatus for synchronization of inter-exchange hand-offs within a cellular telecommunications system is disclosed. A mobile station transmits an indicator to a serving exchange for the mobile station when switching traffic channels during an inter-exchange hand-off. Upon receipt of the indicator, the serving exchange generates a hand-off synchronization message which is transmitted to the anchor exchange for the call to initialize switching of the group switch from a traffic path to the serving exchange to a traffic path to the target exchange.

16 Claims, 4 Drawing Sheets

SYNCHRONIZATION MESSAGES FOR HAND-OFF OPERATIONS

CROSS-REFERENCE TO RELATED APPLICATION

Reference is made to, and priority claimed from, co-pending U.S. Provisional Application for Patent Serial No. 60/065,335 filed on Nov. 13, 1997, entitled "Synchronization Messages for Hand-Off Operations" by Tony Hontzeas. The disclosure of U.S. Provisional Application for Patent Application Serial No. 60/065,335 is hereby incorporated in its entirety.

BACKGROUND OF THE INVENTION

1. Technical Field of the Invention

The present invention relates to inter-exchange hand-offs, and more particularly, to a method for synchronizing a group switch change within an anchor exchange with a mobile telephone traffic channel change during an inter-exchange hand-off.

2. Description of Related Art

Inter-exchange hand-offs involve the passing off of mobile telephone call connections from one mobile switching center to another mobile switching center. Within a hand-off operation, three types of mobile switching center exchanges may be present. An anchor exchange is the mobile switching center with which a call was originated. A serving exchange is the mobile switching center presently serving a call, and a target exchange is a mobile switching center to which a call is being handed off. A serving exchange and a target exchange may also comprise the anchor exchange. A hand-off from a serving exchange to the anchor exchange is known as a hand-off back, while a hand-off from the serving exchange to a non-anchor exchange is referred to as a hand-off to third.

One type of inter-exchange hand-off protocol is the ANSI 41 network protocol. In an ANSI 41 network, when a digital-to-digital or analog-to-digital hand-off is carried out, the problem of speech muting will appear. This problem arises due to the time delay required (about 400 milliseconds) for a mobile telephone to leave a present voice channel (digital or analog) and lock on to a new digital voice channel in the target cell of the target exchange. If the change of voice channels is not synchronized properly with the change of the group switch in the anchor exchange for the call, severe distortion will occur that adversely affects the speech and data quality during the hand-off. This problem is much less severe in analog-to-analog inter-exchange hand-offs because the speech muting delays of locking to an analog voice channel are insignificant. At present, no way exist to synchronize the group switch change of the anchor exchange with the mobile phone inter-exchange hand-off of voice channels. Some method for overcoming this problem is greatly desired.

SUMMARY OF THE INVENTION

The present invention comprises a method and apparatus for the synchronization of inter-exchange hand-offs within a cellular telecommunications system. The method and system enables synchronization of the change of a mobile station from a traffic channel served by a serving exchange to a traffic channel served by a target exchange with the switching of the traffic path for the call at the anchor exchange from the serving exchange to the target exchange. When a mobile station switches from a traffic channel supported by a serving exchange to a traffic channel supported by a target exchange, the mobile station transmits an indicator message to the serving exchange to identify that the change of channels has occurred. In response to the indicator message, the serving exchange transmits a synchronization message to the anchor exchange for the call. In response to the synchronization message, the anchor exchange switches the group switch residing within the anchor exchange from the traffic path to the server exchange to the traffic path at the target exchange. This completes the inter-exchange handoff.

BRIEF DESCRIPTION OF THE DRAWINGS

For a more complete understanding of the present invention, reference is made to the following Detailed Description taken in conjunction with the accompanying drawings wherein.

DETAILED DESCRIPTION OF THE INVENTION

Figure 1:
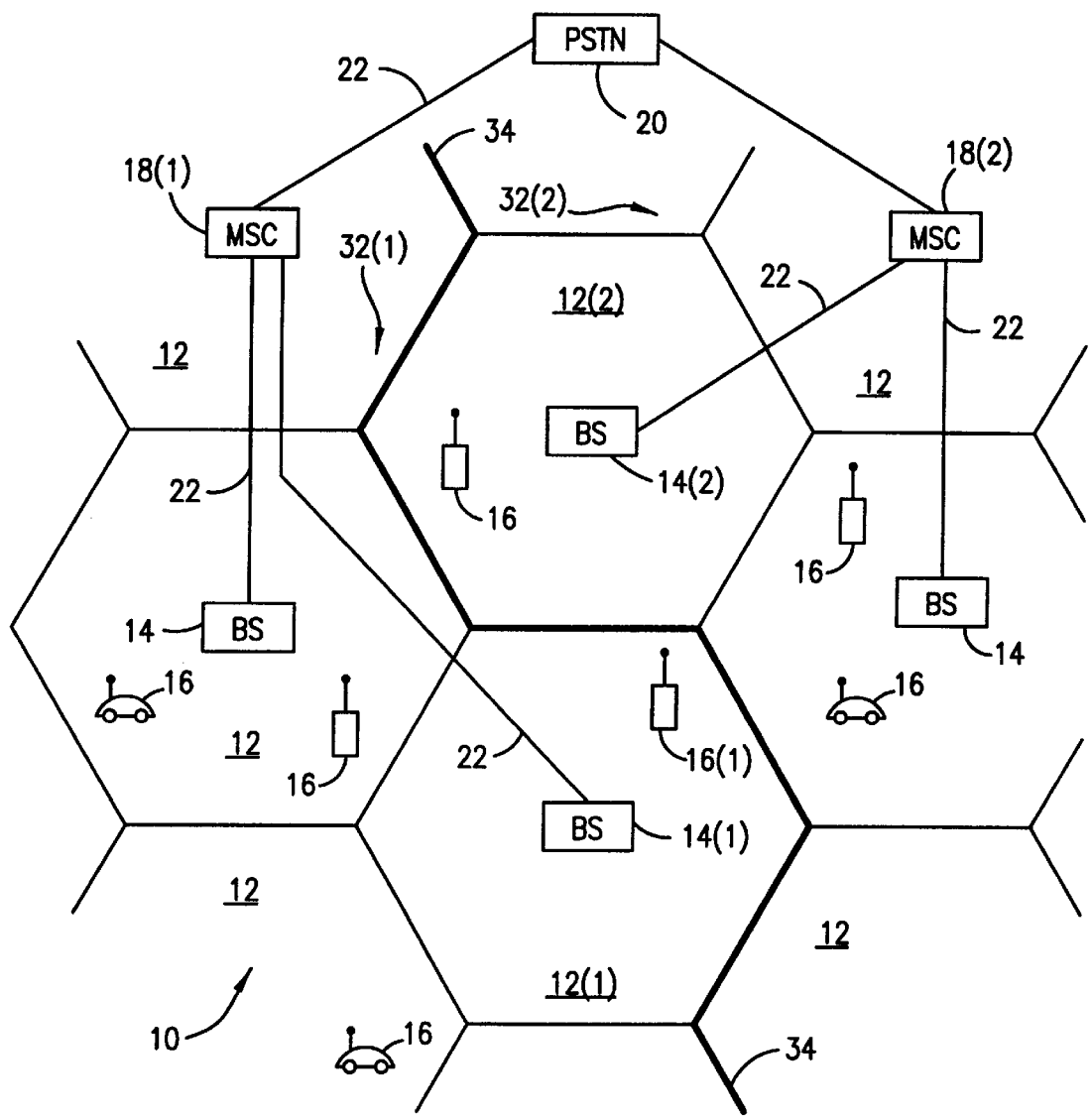
FIG. 1 is a cell diagram illustrating a cell configuration for a cellular telephone network in which the present invention may be implemented.

Reference is now made to FIG. 1 wherein there is shown a cell diagram illustrating an exemplary cell configuration for a cellular telephone network 10 in which the present invention may be implemented. The cellular telephone network 10 operates in accordance with one of a number of known air interface types including, for example, a digital time division multiple access (TDMA) protocol. In a TDMA cellular telephone network, for example, each cell 12 operates with an assigned set of transmission frequencies selected from one or more available hyperbands. The set of frequencies assigned to each cell 12 includes frequencies supporting both at least one control channel and a plurality of traffic channels, with the control and traffic channels operable in either or both an analog and/or a digital mode. Sets of assigned frequencies are different for adjacent cells 12, and such sets are not repeated for use by other cells except for those cells that are far enough away from each other to minimize the likelihood of adjacent or co-channel interference.

North American cellular communications have historically been implemented solely in the 800 MHZ Cellular hyperband. The most recent evolution in cellular communications services involves the adoption of three additional hyperbands for use in handling mobile and personal communications. Of these additional hyperbands, only the Personal Communication Services (PCS) hyperband in the 1900 MHZ frequency range has been completely defined. The network 10 illustrated in FIG. 1 supports operation in either or both the Cellular hyperband and the PCS hyperband, as well as any future defined hyperbands, in connection with the implementation of the present invention in accordance with any air interface protocol type.

In the network 10, a base station 14 is provided for each of the cells 12. The base stations 14 engage in simultaneous communications with plural mobile stations 16 operating roughly within the area of the associated cell 12. The control channel assigned to each cell 12 is used to carry system control signals between the base station 14 and proximately located mobile stations 16, and also to assist in the network with mobile station cell reselection. Such control signals include call originations, page signals, page response signals, location registration signals, traffic channel assignments, maintenance instructions, and cell selection or re-selection instructions. The traffic channels provided in each cell 12 are used to carry subscriber voice or data communications between the base station 14 and proximately located mobile stations 16 and also to assist in the hand-off operation.

The base stations 14 are illustrated as being positioned at or near the center of each of the cells 12. However, depending on geography and other known factors, the base stations 14 may instead be located at or near the periphery of, or otherwise away from the centers of, each of the cells 12. In such instances, the base stations 14 may broadcast and communicate with mobile stations 16 located within the cells 12 using directional rather than omni-directional antennas. Each one of the base stations 14 includes a transmitter, a receiver, and a base station controller (none shown) connected to an antenna (also not shown) in a manner and with a configuration well known in the art.

The base stations 14 further communicate via signaling links and voice trunks 22 with a central control station, commonly referred to as a mobile switching center 18, which functions to control operation of the network 10. The mobile switching centers 18 are interconnected with each other and to the public switched telephone network (PSTN) 20 by the signaling links and voice trunks 22. The mobile switching centers 18 operate to selectively connect subscriber voice and data communications to the mobile stations 16 through its base stations 14. Thus, the mobile switching centers 18 control system operation through and in response to the transmission of control signals over the control channels to set-up on the traffic channels calls that are either originated by or terminated at the mobile stations 16. The mobile switching centers 18 further control, through and in response to control and traffic channel transmissions, the handoff of a subscriber communication from a traffic channel of one cell 12 to a traffic channel of another cell as the subscriber mobile station 16 roams throughout the cellular service area during an ongoing communication.

It is common within one overall cellular service area to have a plurality of system areas 32 (differentiated from each other by the fact that they have different system identifications (SIDs) and perhaps have different service providers). A boundary 34, passing between cells 12 along the border between two system areas 32, is shown in bold in FIG. 1 to delimit the physical extent of each of the illustrated system areas. In this illustrated example, it will be noted that the cells 12 within two system areas 32 are served by different mobile switching centers 18.

As the mobile stations 16 move within the service area of the network 10, instances arise where a mobile station passes between two cells 12 within a single system area 32, or from one cell in a first system area 32(1) to another cell in a second system area 32(2). In moving between the cells 12 in either case, the mobile stations 16, in conjunction with base station 14 information and orders exchanged with and between the mobile switching centers 18, have an opportunity through hand-off to change the base station through which cellular radio communications are being effectuated.

Figure 2A:
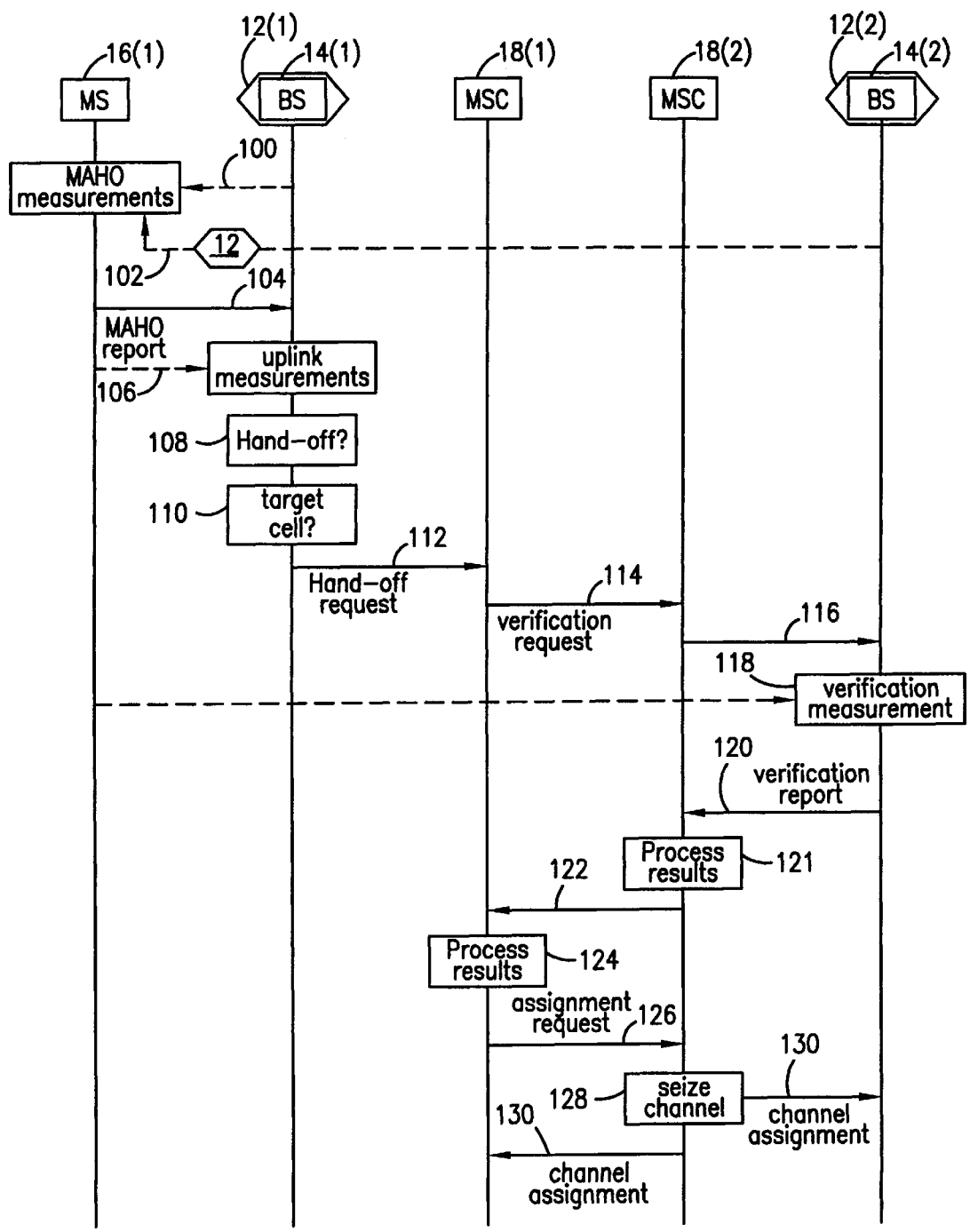
FIGS. 2A–2B are signal flow and network operation diagrams illustrating the operation of the network of FIG. 1 in connection with an inter-exchange hand-off of a mobile station from a cell within a first system area to a cell within a second system area.
Figure 2B:
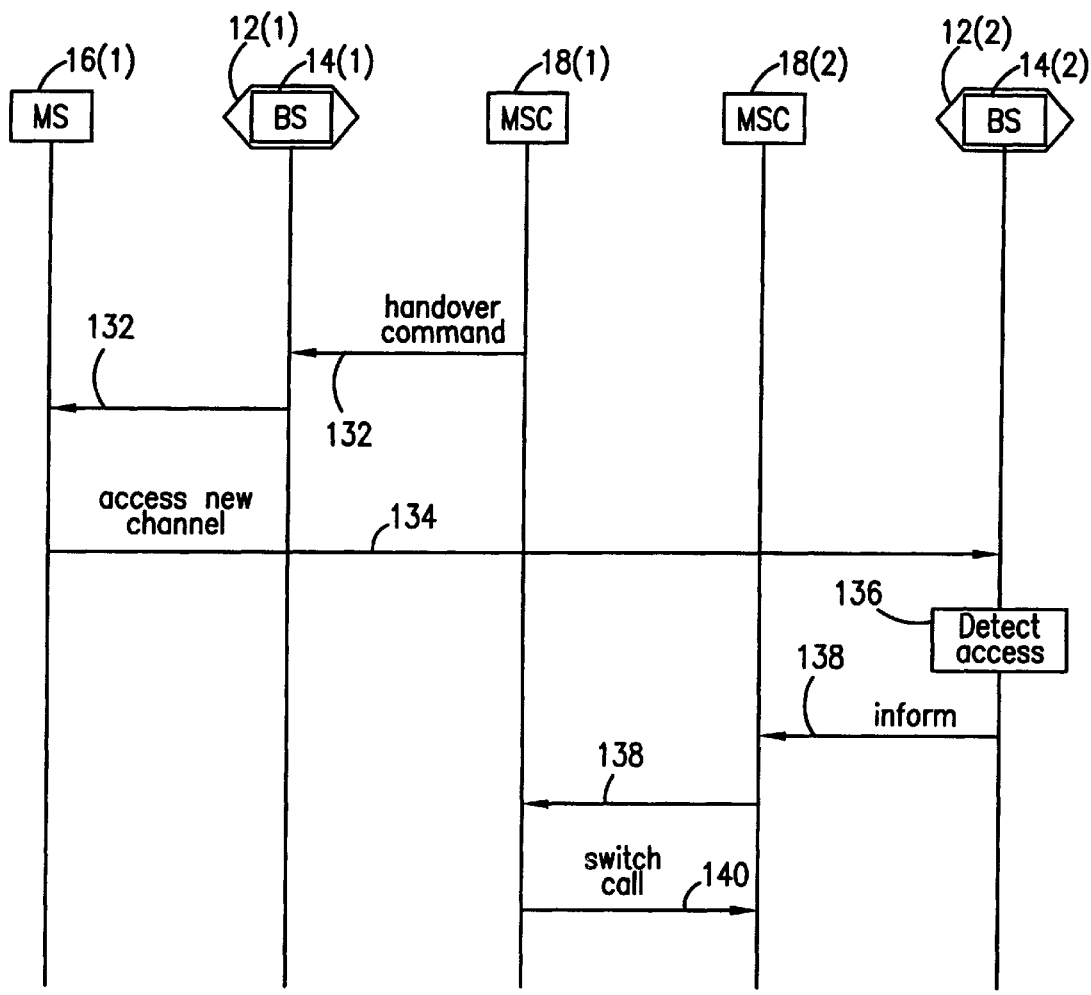

Reference is now made in combination to FIGS. 1 and 2A–2B wherein FIGS. 2A–2B are signal flow and network operation diagrams illustrating operation of the network 10 of FIG. 1 in connection with the inter-exchange hand-off of a mobile station 16(1) from a cell 12(1) within a first system area 32(1) to a cell 12(2) within a second system area 32(2). The mobile station 16(1), operating if capable in accordance with known mobile assisted hand-off (MAHO) principles, periodically makes downlink signal strength measurements 100 on the traffic channel (of cell 12(1)) that is currently being used, and also periodically makes downlink signal strength measurements 102 on the control channels of network identified cells 12, including cell 12(2) in the second system area 32(2), which neighbor the cell 12(1). These signal strength measurements are reported 104 to the base station 14(1) for the currently serving cell 12(1). The base station 14(1) concurrently makes uplink signal strength measurements 106 on the traffic channel that is currently being used by the mobile station 16(1).

The base station 14(1) processes the mobile station 16(1) reported 104 downlink signal strength measurements (100 and 102), if available, and the base station made uplink signal strength measurements (106) to determine first whether a hand-off is necessary (action 108) and second, if yes, to which cell or cells (candidates) the hand-off could and/or should preferably occur (action 110). The process performed by the base station 14(1) for action 110 involves the evaluation of the downlink signal strength measurements 100 in connection with certain hand-off related parameters for the candidate cells comprising: minimum signal strength required for hand-off to a cell (SSMIN); and maximum allowed base station power setting (PSVB). These SSMIN and PSVB parameters are typically set by system operators for each cell within their given system area 32. Historically, the SSMIN and PSVB parameters for the cells 12 in one system area 32 which are located along the border boundary 34 have been provided to the system operator for a neighboring system area 32 for manual input into each mobile switching center 18. Following manual input, these parameters are made available for processing use during inter-exchange hand-off evaluations. In this example, the parameters set by the system operator for target cell 12(2) in the second system area 32(2) must be provided to and considered by the first system area 32(1) during the evaluation of the downlink signal strength measurements.

Continuing with the present example, it is assumed that the base station 14(1) determines 108 from deteriorating measured uplink and/or downlink signal strengths that a hand-off is necessary. It is further assumed that an identification 110 is made of cell 12(2) in system area 32(2) as the preferred candidate (target) cell for hand-off. Accordingly, in this instance, the base station 14(1) favorably evaluated the signal strength measurements in view of the SSMIN and PSVB parameters for the target cell 12(2) of system area 32(2). A request 112 for hand-off including information comprising an identification of the currently serving cell 12(1), the traffic channel being used for communication with mobile station 16(1) in cell 12(1), and the target cell 12(2) for hand-off, is then sent by the base station 14(1) to the serving mobile switching center 18(1). A hand-off if approved in this instance would comprise an inter-exchange hand-off because the target cell 12(2) is served by a mobile switching center 18(2) (serving system area 32(2)) different from the mobile switching center 18(1) serving the current cell 12(1) (serving system area 32(1)). The foregoing description is only an example of the procedure used in making the determination to institute a hand-off. It will, of course, be understood that more than one target cell 12 may be identified by the process of action 110 for further hand-off consideration.

The currently serving mobile switching center 18(1) then signals 114 the mobile switching center 18(2) associated with the target cell 12(2) requesting verification of base station 14(2) communications capability with the mobile station 16(1). It is understood that multiple signals 114 may be sent if more than one target cell 12 has been identified for further hand-off consideration. The signal 114, similar to the request 112 sent by the base station 14(1), includes information comprising an identification of the currently serving cell 12(1) and the traffic channel being used for communication with mobile station 16(1) in cell 12(1). Responsive thereto, the mobile switching center 18(2) identifies the cells defined for the serving cell 12(1), and then signals 116 the base station 14(2) for the target cell 12(2) to make a verifying signal strength measurement (action 118) on the traffic channel currently being used by the mobile station 16(1) in the currently serving cell 12(1).

The base station 14(2) then reports 120 the results of the verification signal strength measurement to the mobile switching center 18(2). An evaluation of the verification signal strength measurement is then made (action 121) by the mobile switching center 18(2) to confirm the locating of the mobile station in view of expected signal strengths. This evaluation is made in connection with certain hand-off related parameters for the currently serving cell 12(1) comprising: power setting used on measurement channel (PSMB); and maximum power level at voice channel (PLVM). These PSMB and PLVM parameters are typically set by system operators for each cell within a given system area 32. Historically, the PSMB and PLVM parameters for the cells 12 in one system area 32 which are located along the border boundary 34 have been provided to the system operator for a neighboring system area 32 for manual input to each mobile switching center 18. Following manual input, these parameters are made available for processing use during inter-exchange hand-off evaluations. In this example, the parameters set by the system operator for serving cell 12(1) in the first system area 32(1) must be provided to and considered by the second system area 32(2) during the evaluation of the verification signal strength measurements. After the evaluation, the mobile switching center 18(2) forwards 122 the results of the verification measurement back to the mobile switching center 18(1). The results are then processed (action 124) by the mobile switching center 18(1) to determine whether a hand-off to target cell 12(2) should be made. This determination of action 124 again involves the evaluation of each reported verification signal strength measurement by the mobile switching center 18(2) in connection with the PSMB and PLVM parameters for the currently serving cell 12(1).

If the determination is affirmative with respect to the target cell 12(2), and if no other target cell is identified as a better choice, the mobile switching center 18(1) signals 126 the mobile switching center 18(2) requesting assignment (and reservation) of a traffic channel for hand-off to the target cell 12(2). A traffic channel is seized (action 128), and then both the base station 14(2) and mobile switching center 18(1) are informed 130 of the assignment by the mobile switching center 18(2) of the traffic channel in the target cell 12(2). The mobile switching center 18(1) then signals 132 the mobile station 16(1) via the base station 14(1) for the currently serving cell 12(1) with a handover command directing the mobile station to switch to the assigned traffic channel in the target cell 12(2). The mobile station 16(1) then tunes to and accesses 134 the assigned traffic channel and transmits an indication to mobile station 18(1) that the mobile station is switching to the new channel. When the base station 14(2) detects the mobile station access (action 136), the mobile switching centers 18(1) and 18(2) are informed 138, and the call is switched 140 to the mobile switching center 18(2) for further handling to complete the hand-off procedure. This process will be more fully discussed with respect to FIGS. 3 and 4.

Within an inter-exchange hand-off the mobile switching center with which the mobile station originated or received a call is referred to as the anchor exchange. The mobile switching center currently serving the mobile station is referred to as the serving exchange, and the mobile switching center to which a call is being handed-off is referred to as the target exchange. A serving exchange and target exchange may also comprise an anchor exchange. A hand-off from a serving exchange to a mobile switching center which is not the anchor exchange is referred to as a hand-off to third under the ANSI 41 Revision b protocol standard, and a hand-off to a mobile switching center which does comprise the anchor exchange is referred to as a hand-off back.

Figure 3:
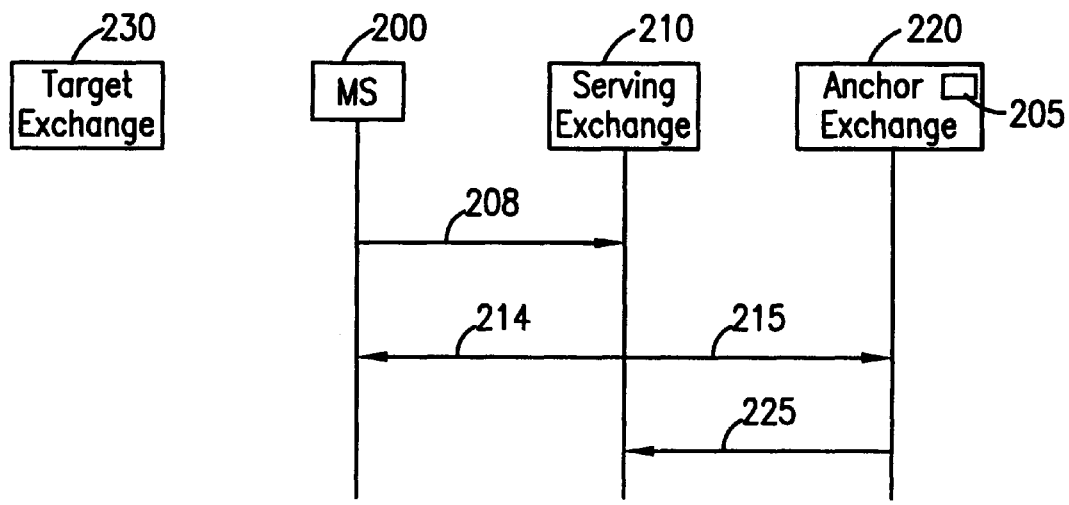
FIG. 3 is a signal flow diagram illustrating a hand-off to third utilizing a hand-off synchronization message.

Referring now to FIG. 3, there is illustrated a signaling diagram describing the synchronization of the change between traffic channels at the mobile station 200 and the switching of a group switch 205 at the anchor exchange 220 for a hand-off to third process. The mobile exchange 200 transmits an indication message 208 to the serving exchange 210 indicating that the mobile station 200 is leaving the present traffic channel and tuning to a new traffic channel on the target exchange 230. Upon receipt of the indication message 208 by the serving exchange 210, the serving exchange transmits an acknowledgment 214 to the mobile station 200 and a hand-off synchronization message 215 to the anchor exchange 220. In response to the hand-off synchronization message 215, the anchor exchange 220 transmits an acknowledgment message 225 back to the serving exchange 210 and proceeds to change the group switch 205 from the traffic path leading to the serving exchange 210 to the traffic path leading to the target exchange 230.

Figure 4:
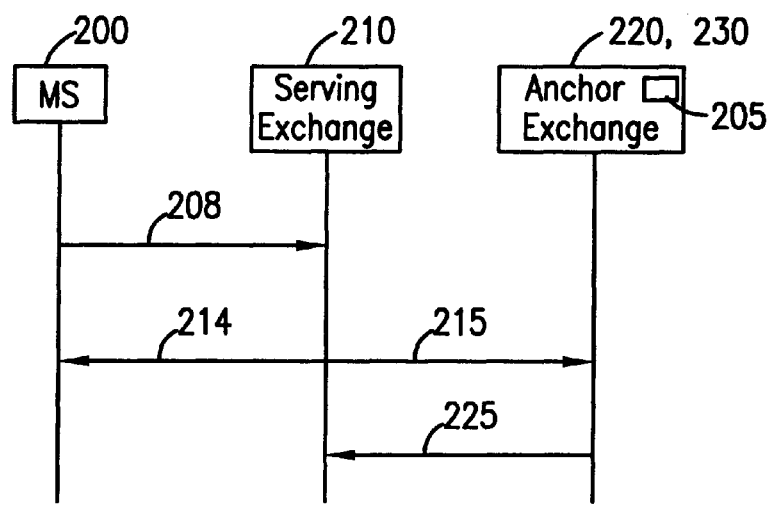
FIG. 4 is a signal flow diagram illustrating a hand-off back utilizing a hand-off synchronization message.

Referring now to FIG. 4, there is illustrated a hand-off back procedure for hand-off between a serving exchange 210 and a target exchange 230 that is the anchor exchange 220. When the mobile station 200 is prepared to leave the current traffic channel for a traffic channel served by the anchor exchange 220, the mobile station transmits an indication message 208 to the serving exchange 210 indicating that the mobile station is changing to the new traffic channel. Upon receipt of the indication message 208 at the serving exchange 210, the serving exchange transmits an acknowledgment message 214 to the mobile station and a hand-off synchronization message 215 to the anchor exchange 220. The anchor exchange 220 sends a hand-off synchronization message acknowledgment 225 to the serving exchange 210 and proceeds to change the group switch 205 at the anchor exchange 220 from the traffic path leading to the serving exchange to a traffic path leading to the exchange anchor controlling the traffic channel to which the mobile station just tuned.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A method for synchronization of inter-exchange hand-offs within a cellular telecommunications system, comprising the steps of:

transmitting an indicator from a mobile station to a serving exchange when the mobile station changes from a traffic channel supported by the serving exchange to a traffic channel supported by a target exchange, the indicator indicating that the mobile station has changed from the traffic channel supported by the serving exchange to the traffic channel supported by the target exchange;

transmitting from the serving exchange, in response to receipt of the indicator, a hand-off synchronization message to the anchor exchange; and switching, in response to the synchronization message, a group switch at the anchor exchange from a traffic path to the serving exchange to a traffic path to the target exchange.

2. The method of claim 1 further including the step of:

transmitting an acknowledgment from the anchor exchange to the serving exchange in response to the hand-off synchronization message.

3. The method of claim 2 further including the step of transmitting an acknowledgment of receipt of the indication to mobile station from the serving exchange.

4. The method of claim 1, wherein the anchor exchange and the target exchange are the same exchange.

5. The method of claim 1, wherein the anchor exchange and the target exchange are not the same exchange.

6. A method for synchronization of inter-exchange hand-offs within a cellular telecommunications system, comprising the steps of:

transmitting an indicator from a mobile station to a serving exchange when the mobile station changes from a traffic channel supported by the serving exchange to a traffic channel supported by an anchor exchange, the indicator indicating that the mobile station has changed from the traffic channel supported by the serving exchange to the traffic channel supported by the target exchange;

transmitting from the serving exchange, in response to receipt of the indicator, a hand-off synchronization message to the anchor exchange; and switching, in response to the hand-off synchronization message, a group switch at the anchor exchange from a traffic path to the serving exchange to a traffic path to the anchor exchange.

7. The method of claim 6 further including the step of:

transmitting an acknowledgment from the anchor exchange to the serving exchange in response to the hand-off synchronization message.

8. The method of claim 6 further including the step of transmitting an acknowledgment of receipt of the indication to mobile station from the serving exchange.

9. A method for synchronization of inter-exchange hand-offs within a cellular telecommunications system, comprising the steps of:

transmitting an indicator from a mobile station to a serving exchange when the mobile station changes from a traffic channel supported by the serving exchange to a traffic channel supported by a non-anchor, target exchange, the indicator indicating that the mobile station has changed from the traffic channel supported by the serving exchange to the traffic channel supported by the target exchange;

transmitting from the serving exchange, in response to receipt of the indicator, a hand-off synchronization message to the anchor exchange; and switching, in response to the hand-off synchronization message, a group switch at the anchor exchange from a traffic path to the serving exchange to a traffic path to the non-anchor, target exchange.

10. The method of claim 9 further including the step of:

transmitting an acknowledgment from the anchor exchange to the serving exchange in response to the hand-off synchronization message.

11. The method of claim 9 further including the step of transmitting an acknowledgment of receipt of the indication to mobile station.

12. A mobile telecommunications switching network, comprising:

a serving exchange, responsive to an indicator from a mobile station that the mobile station has changed from a traffic channel supported by the serving exchange to a traffic channel supported by the target exchange, for generating a synchronization message, wherein the indicator identifies switching of the mobile station from a channel supported by the serving exchange to a channel supported by a target exchange; and an anchor exchange responsive to the synchronization message from the serving exchange for changing a group switch from a traffic path leading to the serving exchange to a traffic path leading to the target exchange.

13. The method of claim 1, wherein the anchor exchange and the target exchange are the same exchange.

14. The method of claim 1, wherein the anchor exchange and the target exchange are not the same exchange.

15. The mobile telecommunications switching network of claim 12, wherein the anchor exchange further transmits an acknowledgment of receipt of the synchronization message to the serving exchange.

16. The mobile telecommunications switching network of claim 12, wherein the serving exchange further transmits an acknowledgment of receipt of the indicator to the mobile station.

* * * * *